(12) United States Patent
Koch et al.

(10) Patent No.: US 9,464,158 B2
(45) Date of Patent: Oct. 11, 2016

(54) POLYOLS, PREPARATION AND USE THEREOF

(71) Applicant: BASF SE, Ludwigshafen (DE)

(72) Inventors: Sebastian Koch, Lemfoerde (DE); Christian Koenig, Mannheim (DE)

(73) Assignee: BASF SE, Ludwigshafen (DE)

( * ) Notice: Subject to any disclaimer, the term of this patent is extended or adjusted under 35 U.S.C. 154(b) by 10 days.

(21) Appl. No.: 14/155,569

(22) Filed: Jan. 15, 2014

(65) Prior Publication Data

US 2014/0200327 A1 Jul. 17, 2014

Related U.S. Application Data

(60) Provisional application No. 61/752,464, filed on Jan. 15, 2013.

(51) Int. Cl.

| | |
|---|---|
| *C07H 13/06* | (2006.01) |
| *C08G 71/04* | (2006.01) |
| *C07H 1/00* | (2006.01) |
| *C08G 18/48* | (2006.01) |
| *C08G 65/26* | (2006.01) |

(52) U.S. Cl.
CPC ....... *C08G 18/4883* (2013.01); *C08G 18/4891* (2013.01); *C08G 65/2606* (2013.01); *C08G 65/2609* (2013.01); *C08G 65/2615* (2013.01)

(58) Field of Classification Search
None
See application file for complete search history.

(56) References Cited

U.S. PATENT DOCUMENTS

2008/0114086 A1\* 5/2008 Lorenz et al. ................. 521/88

FOREIGN PATENT DOCUMENTS

| | | |
|---|---|---|
| DE | 10 2008 051 882 A1 | 4/2010 |
| EP | 1 923 417 A1 | 5/2008 |
| EP | 2 177 555 A2 | 4/2010 |
| EP | 2 365 019 A1 | 9/2011 |
| GB | 1049126 | \* 11/1966 |

\* cited by examiner

*Primary Examiner* — Jeffrey Washville
(74) *Attorney, Agent, or Firm* — Oblon, McClelland, Maier & Neustadt, L.L.P.

(57) ABSTRACT

The present invention relates to polyols and the preparation and use thereof.

22 Claims, 1 Drawing Sheet

POLYOLS, PREPARATION AND USE THEREOF

Figure 1:
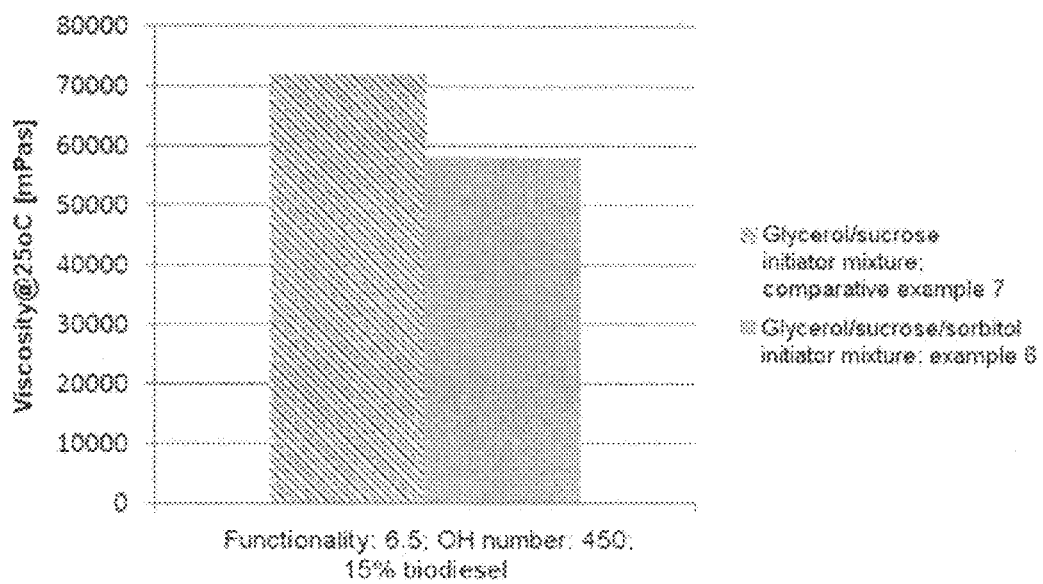

The present invention relates to polyols and the preparation and use thereof. Polyols based on sugar-glycerol mixtures as starter are used in a standard manner in polyurethane foams in order to increase the network density and thus to improve the mechanical properties. Mixtures of sorbitol and glycerol or mixtures of sucrose and glycerol are normally used. The starter mixtures are necessary to cause the crystalline sugar to react, to prevent the decomposition of the starter compounds and to establish the desired mean starter functionality of the polyol. It is known to those skilled in the art that raising the starter functionality of the polyols markedly increases the viscosity. It is further known that sorbitol-started polyols with comparable starter functionality and OH number have lower viscosity than sucrose-started polyols. Sorbitol-started polyols, however, due to their structure, can reach starter functionalities no higher than 6. With sucrose as starter, considerably higher starter functionalities, up to a maximum of 8, can be reached. These polyols, however, have such a high viscosity that they can no longer be processed industrially. This relatively high starter functionality is, however, particularly desirable in order to achieve improved pressure resistances. With polyol blends, i.e. purely physical mixtures of sorbitol- and sucrose-started polyols, although higher starter functionalities can be reached than with pure sorbitol-started polyols, the mix viscosity of such blends is approximately the stoichiometric mean of the starting viscosities and consequently still too high to be able to be used in existing formulations.

In the scope of the current disclosure the term starter functionality refers to the average number of functional groups per functional starter molecule which has been charged at the start of the reaction.

DE102008051882A1 describes the use of sorbitol/sucrose starter mixtures for the synthesis of polyetherester polyols. In this case, 70% by weight solutions of sorbitol and sucrose, after distilling off the water, are reacted with soybean oil under imidazole catalysis. These polyetherester polyols are then added to a further starter mixture of sorbitol/sucrose. This prevents any decomposition of the starter mixture and enables a better uptake of propylene oxide in the reaction mixture.

Although this disclosure seems to enable the use of an increased amount of sucrose in the starter mixture, it does not provide any approaches to a solution for high functionality, low viscosity polyols having high hydroxy values.

EP 1923417A1 describes the synthesis and use of polyetherester polyols based on sorbitol/glycerol and/or sucrose/glycerol mixtures with triglycerides. This document discloses polyols having an OH number less than 400 mg/KOH and a starter functionality <4.5. These polyols exhibit a comparatively high capacity for hydrophobic substances such as cyclopentane, but they do not enable the synthesis of low viscosity, high functionality polyols.

EP2365019A1 describes a coupled process for preparing high functionality starter compounds which are solid or highly viscous under reaction conditions, and monofunctional starter compounds which are liquid under reaction conditions.

The method disclosed enables the synthesis of high functionality polyols, the viscosity of which is not described. However, by virtue of the distillative removal of the propoxylated monofunctional starter compound, this method is associated with the loss of propylene oxide used, is time-consuming and energy-intensive and thus, from an economic point of view, cannot be employed.

EP 2 177 555 A2 discloses a method for preparing polyetherester polyols in which, inter alia, mixtures of sucrose, sorbitol, fatty acid esters and alkylene oxides are used. No additional co-starter is used in the example. Relatively low functionalities are achieved, whereby the problem of high viscosities in the product does not occur to the degree as with higher functional polyols.

The object of the present invention is therefore to prepare, in a highly economically and ecologically efficient manner, high functionality sugar polyols having high OH numbers and low viscosities.

The object was surprisingly achieved by the use of propoxylated starter mixtures of sucrose, sorbitol, glycerol and biodiesel. In this context, biodiesel is a mixture of fatty acid methyl esters, which may consist of, inter alia, palm oil methyl ester, rapeseed oil methyl ester, sunflower methyl ester, soybean oil methyl ester and also animal fat methyl ester.

This is because it has surprisingly been shown that propoxylated starter mixtures of sucrose, sorbitol, glycerol and biodiesel give rise to polyols having significantly lower viscosities than the corresponding polyol blends of a corresponding sorbitol-started polyol and a corresponding sucrose-started polyol. A significant reduction of the viscosity can be achieved even with low sorbitol proportions. This invention therefore enables, for the first time, the synthesis of high functionality polyols having high hydroxy values and simultaneously low viscosities.

The present invention therefore relates to a polyol, obtainable by reacting a mixture of
 a1) 0.5-43% of sucrose,
 a2) 0.5-36% of sorbitol,
 a3) 0.5-12% of glycerol,
 a4) 0.5-30% of one or more fatty acids and/or fatty acid esters, and
 a5) 21-82% of one or more alkylene oxides having 2 to 4 carbon atoms, in the presence of a catalyst.

Further objects of the present invention are also a method for preparing a polyol, as described in the claims, and also the use of a polyol according to the invention, or of a polyol prepared by the method according to the invention, for preparing polyurethanes.

In a preferred embodiment of the polyol according to the invention or of the method according to the invention, 5 to 18% by weight of the component a4) is present.

In a further preferred embodiment of the polyol according to the invention or of the method according to the invention for preparing a polyol, the component a4) comprises fatty acid ester monoesters and/or fatty acid monoester derivatives, preferably oleic acid, oleic acid methyl ester and/or an oleic acid derivative.

In a further preferred embodiment of the polyol according to the invention or of the method according to the invention for preparing a polyol, the component a4) comprises a compound selected from the group consisting of fatty acid methyl esters and oleic acid methyl ester. The component a4) particularly preferably comprises a compound selected from the group consisting of fatty acid methyl ester and oleic acid methyl ester, but not a fatty acid.

In a further preferred embodiment of the polyol according to the invention or of the method according to the invention for preparing a polyol, the alkylene oxide of the component a5) comprises propylene oxide. With particular preference, the alkylene oxide of the component a5) consists of propylene oxide.

In a further preferred embodiment of the polyol according to the invention or of the method according to the invention for preparing a polyol, the OH number is from 400 to 700 mg KOH/g, particularly preferably from 450 to 650 mg KOH/g, especially preferably from 480 to 550 mg KOH/g.

In a further preferred embodiment of the polyol according to the invention or of the method according to the invention for preparing a polyol, the starter functionality is from 2.5 to 8, preferably from 4 to 6, particularly preferably from 4.2 to 5.5.

In a further preferred embodiment of the polyol according to the invention or of the method according to the invention for preparing a polyol, the catalyst is selected from the group consisting of the aminic catalysts. Particular preference is given to imidazole.

The figures show the viscosity of polyols, inter alia, as a function of the proportion of sorbitol in the polyol as percentage by weight.

FIG. 1:

Comparative example 7 is a high functionality sugar polyol (functionality 6.5) prepared according to the prior art and with a high OH number of 450. The viscosity of this polyol (72 170 mPas at 20° C.) is very high and does not allow the polyol to be used in polyurethane formulations. Example 6 shows, in accordance with the invention, at the same functionality and OH number, a significantly lower viscosity of 58 090 mPas at 20° C. (20% lower). This is probably a result of the modified starter mixture. The starter mixture in example 6 consists of glycerol/sucrose/sorbitol, in contrast to comparative example 7 in which the starter mixture consists only of glycerol/sucrose. If only physical mixtures of polyols with glycerol/sucrose or glycerol/sorbitol starter mixtures are used, however, the effect of the lowered viscosity at the same OH number and functionality cannot be achieved (see FIG. 2).

FIG. 2:

If polyols having the same composition with respect to the content of glycerol/sucrose/sorbitol/propylene oxide/biodiesel are compared, these polyols, surprisingly, have different viscosities depending on the manner of preparation. If starter mixtures of glycerol/sucrose/sorbitol are used, the viscosities in this example are up to 45% lower than in polyols in which a glycerol/sucrose started polyol and a glycerol/sorbitol started polyol, prepared independently of one another, have been physically mixed with one other. This is the case, even though these mixtures have the same glycerol/sucrose/sorbitol/propylene oxide/biodiesel content and thus the same functionality and OH number.

EXAMPLES

Hereinafter, some examples are given to illustrate the invention. The examples here are only for illustrative purposes and are on no account intended to limit the scope of the claims.

The viscosity was determined according to DIN 53018 at 20° C. The OH number was determined according to DIN 53240.

The physical mixtures were prepared by stirring the respective stated polyols for a period at room temperature until a homogeneous mixture has been obtained.

Example 1

Preparation of a Polyetherester with Glycerol, Sucrose, Sorbitol and Biodiesel 14.4 g of glycerol, 0.1 g of imidazole, 48.7 g of sucrose, 16.1 g of sorbitol and 60.0 g of biodiesel were charged in a reactor at 25° C. The reactor was subsequently inertized with nitrogen. The chamber was heated to 130° C. and 100.7 g of propylene oxide were metered in. After a reaction time of 5 h, the chamber was evacuated under full vacuum for 40 minutes at 100° C. and subsequently cooled to 25° C. 220.4 g of product were obtained.

The polyetherester obtained had the following characteristic parameters:
OH number: 497.0 mg KOH/g
Viscosity (20° C.): 87 660 mPas
Acid number: less than 0.01 mg KOH/g
Water content: 0.014%
Starter functionality: 5.5

Example 2

Preparation of a Polyetherester with Glycerol, Sucrose, Sorbitol and Biodiesel 11.4 g of glycerol, 0.1 g of imidazole, 29.8 g of sucrose, 31.6 g of sorbitol and 60.4 g of biodiesel were charged in a reactor at 25° C. The reactor was subsequently inertized with nitrogen. The chamber was heated to 130° C. and 160.6 g of propylene oxide were metered in. After a reaction time of 6 h, the chamber was evacuated under full vacuum for 40 minutes at 100° C. and subsequently cooled to 25° C. 215.6 g of product were obtained.

The polyetherester obtained had the following characteristic parameters:
OH number: 497.6 mg KOH/g
Viscosity (20° C.): 36 100 mPas
Acid number: less than 0.01 mg KOH/g
Water content: 0.012%
Starter functionality: 5.5

Example 3

Preparation of a Polyetherester with Glycerol, Sucrose, Sorbitol and Biodiesel 7.8 g of glycerol, 0.1 g of imidazole, 11.9 g of sucrose, 48.7 of sorbitol and 60.0 g of biodiesel were charged in a reactor at 25° C. The reactor was subsequently inertized with nitrogen. The chamber was heated to 130° C. and 111.4 g of propylene oxide were metered in. After a reaction time of 6 h, the chamber was evacuated under full vacuum for 40 minutes at 100° C. and subsequently cooled to 25° C. 213.9 g of product were obtained.

The polyetherester obtained had the following characteristic parameters:
OH number: 485.7 mg KOH/g
Viscosity (20° C.): 34 310 mPas
Acid number: 0.012 mg KOH/g
Water content: 0.012%
Starter functionality: 5.5

Comparative Example 4

Preparation of a Polyetherester with Glycerol, Sucrose and Biodiesel 17.7 g of glycerol, 0.1 g of imidazole, 66.8 of sucrose and 60.0 g of biodiesel were charged in a reactor at 25° C. The reactor was subsequently inertized with nitrogen. The chamber was heated to 130° C. and 93.9 g of propylene oxide were metered in. After a reaction time of 4 h, the chamber was evacuated under full vacuum for 40 minutes at 100° C. and subsequently cooled to 25° C. 213.9 g of product were obtained.

The polyetherester obtained had the following characteristic parameters:

OH number: 492.6 mg KOH/g
Viscosity (20° C.): 119 600 mPas
Acid number: less than 0.01 mg KOH/g
Starter functionality: 5.5

Comparative Example 5

Preparation of a Polyetherester with Glycerol, Sorbitol and Biodiesel 5.7 g of glycerol, 0.1 g of imidazole, 59.3 of sorbitol and 60.0 g of biodiesel were charged in a reactor at 25° C. The reactor was subsequently inertized with nitrogen. The chamber was heated to 130° C. and 114.9 g of propylene oxide were metered in. After a reaction time of 4 h, the chamber was evacuated under full vacuum for 40 minutes at 100° C. and subsequently cooled to 25° C. 213.6 g of product were obtained.

The polyetherester obtained had the following characteristic parameters:

OH number: 515.3 mg KOH/g
Viscosity (20° C.): 31 870 mPas
Acid number: less than 0.01 mg KOH/g
Starter functionality: 5.5

Example 6

Preparation of a Polyetherester with Glycerol, Sucrose, Sorbitol and Biodiesel 6.9 g of glycerol, 0.1 g of imidazole, 65.3 g of sucrose, 5.2 of sorbitol and 36.0 g of biodiesel were charged in a reactor at 25° C. The reactor was subsequently inertized with nitrogen. The chamber was heated to 130° C. and 126.4 g of propylene oxide were metered in. After a reaction time of 6 h, the chamber was evacuated under full vacuum for 40 minutes at 100° C. and subsequently cooled to 25° C. 208.5 g of product were obtained.

The polyetherester obtained had the following characteristic parameters:

OH number: 453.8 mg KOH/g
Viscosity (25° C.): 58 090 mPas
Acid number: less than 0.01 mg KOH/g
Starter functionality: 6.5

Comparative Example 7

Preparation of a Polyetherester with Glycerol, Sucrose and Biodiesel 8.0 g of glycerol, 0.1 g of imidazole, 71.2 of sucrose and 36.0 g of biodiesel were charged in a reactor at 25° C. The reactor was subsequently inertized with nitrogen. The chamber was heated to 130° C. and 124.7 g of propylene oxide were metered in. After a reaction time of 3 h, the chamber was evacuated under full vacuum for 40 minutes at 100° C. and subsequently cooled to 25° C. 214.5 g of product were obtained.

The polyetherester obtained had the following characteristic parameters:

OH number: 450.8 mg KOH/g
Viscosity (25° C.): 72 170 mPas
Acid number: less than 0.01 mg KOH/g
Starter functionality: 6.5

Figure 2:
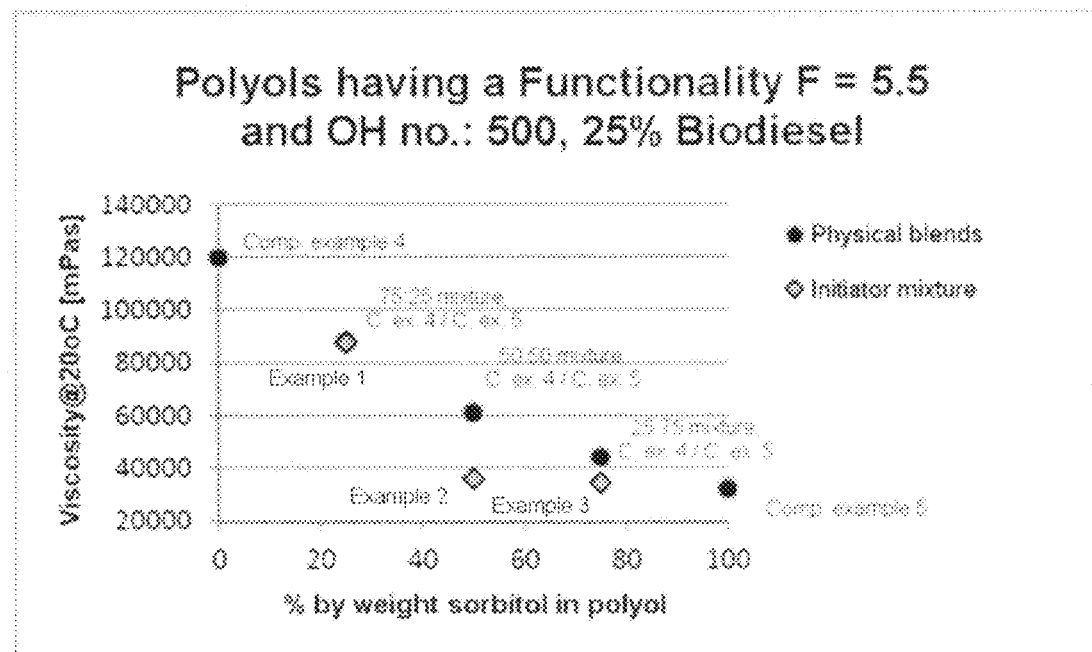

On the basis of the examples (1 to 3 and 6) and comparative examples (4, 5 and 7) and on the basis of FIGS. 1 and 2, it can be seen that the viscosity of the polyols which are obtained from the direct alkoxylation of a glycerol-sorbitol-sucrose mixture is lower than the viscosity of a polyol having an almost identical OH number and functionality but which is a physical blend of a) a polyol prepared from glycerol and sorbitol with b) a polyol prepared from glycerol and a glycerol-sorbitol mixture.

| Examples | Glycerol | Sorbitol | Sugar | Biodiesel | OH number | F | Viscosity |
|---|---|---|---|---|---|---|---|
| 1 | 5.45 | 6.1 | 18.4 | 22.7 | 497 | 5.5 | 87 660 |
| 2 | 4.41 | 12.23 | 11.54 | 23.4 | 497.6 | 5.5 | 36 100 |
| 3 | 3.08 | 19.21 | 4.7 | 23.7 | 485.7 | 5.5 | 34 310 |
| 4 | 6.57 | 0 | 24.8 | 22.3 | 492 | 5.5 | 119 600 |
| 5 | 2.28 | 23.71 | 0 | 24 | 515 | 5.5 | 31 870 |
| 6 | 2.89 | 2.18 | 27.38 | 15 | 454 | 6.5 | 58 090 |
| 7 | 3.33 | 0 | 29.6 | 15 | 451 | 6.5 | 72 170 |

| Physical mixture | Ratio | | OH number | F | Viscosity |
|---|---|---|---|---|---|
| Ex. 4 | 100 | 0 | 485.7 | 5.5 | 119 600 |
| Ex. 4 + 5 | 75 | 25 | 497.8 | 5.5 | |
| Ex. 4 + 5 | 50 | 50 | 503.5 | 5.5 | |
| Ex. 4 + 5 | 25 | 75 | 509.0 | 5.5 | |
| Ex. 5 | 0 | 100 | 515.0 | 5.5 | 31 870 |

The invention claimed is:

1. A polyol, obtained by reacting a mixture comprising
   a1) 0.5-43% by weight of sucrose,
   a2) 0.5-36% by weight of sorbitol,
   a3) 0.5-12% by weight of glycerol,
   a4) 0.5-30% by weight of one or more fatty acids and/or fatty acid esters, and
   a5) 21-82% by weight of one or more alkylene oxides having 2 to 4 carbon atoms,
   in the presence of a catalyst,
   wherein said polyol has a viscosity >31,870 to <119,600 mPas.

2. The polyol according to claim 1, wherein a4) comprises a fatty acid ester monoester and/or a fatty acid monoester derivative.

3. The polyol according to claim 1, wherein the alkylene oxide of a5) comprises propylene oxide.

4. The polyol according to claim 1, having an OH number of 400 to 700 mg KOH/g.

5. The polyol according to claim 1, wherein a starter functionality is from 2.5 to 8.

6. The polyol according to claim 1, wherein the catalyst is an aminic catalyst.

7. A method for preparing a polyol, the method comprising reacting a mixture of
   a1) 0.5-43% by weight of sucrose,
   a2) 0.5-36% by weight of sorbitol,
   a3) 0.5-12% by weight of glycerol,
   a4) 0.5-30% by weight of one or more fatty acids and/or fatty acid esters, and
   a5) 21-82% by weight of one or more alkylene oxides having 2 to 4 carbon atoms,
   in the presence of a catalyst, to obtain a polyol,
   wherein said polyol has a viscosity >31,870 to <119,600 mPas.

8. The method according to claim 7, wherein a4) comprises a fatty acid ester monoester and/or a fatty acid monoester derivative.

9. The method according to claim 7, wherein the alkylene oxide of a5) comprises propylene oxide.

10. The method according to claim 7, wherein an OH number of the obtained polyol is from 400 to 700 mg KOH/g.

11. The method according to claim 7, wherein a starter functionality is from 2.5 to 8.

12. The method according to claim 7, wherein the catalyst is an aminic catalyst.

13. The method according to claim 7, wherein a temperature during the reaction is in the range from 80 to 140° C. and/or wherein the reaction takes 30 minutes to 10 hours.

14. A polyurethane comprising, in reacted form, the polyol according to claim 1.

15. The polyol according to claim 1, wherein a4) comprises a fatty acid.

16. The polyol according to claim 1, wherein a4) comprises a fatty acid ester.

17. The polyol according to claim 1, wherein a4) comprises oleic acid, oleic acid methyl ester, or an oleic acid derivative.

18. The polyol according to claim 1, having an OH number of 480 to 550 mg KOH/g.

19. The polyol according to claim 1, wherein a starter functionality is from 4.2 to 5.5.

20. The polyol according to claim 1, wherein the catalyst is imidazole.

21. The polyol according to claim 1, wherein said polyol has a viscosity ≥34,310 mPas.

22. The method according to claim 7, wherein said polyol has a viscosity ≥34,310 mPas.

* * * * *